(12) United States Patent
Szapiel

(10) Patent No.: US 6,268,944 B1
(45) Date of Patent: Jul. 31, 2001

(54) FREE-SPACE OPTICAL LASERCOM SYSTEM

(75) Inventor: Stanislaw Szapiel, Campbellville (CA)

(73) Assignee: COM DEV Limited, Cambridge (CA)

( * ) Notice: Subject to any disclaimer, the term of this patent is extended or adjusted under 35 U.S.C. 154(b) by 0 days.

(21) Appl. No.: 09/026,370

(22) Filed: Feb. 19, 1998

(51) Int. Cl.[7] .................................................. H04B 10/00
(52) U.S. Cl. .......................... 359/159; 359/152; 359/172
(58) Field of Search .................................. 359/152, 153, 359/159, 172

(56) References Cited

U.S. PATENT DOCUMENTS

| | | | |
|---|---|---|---|
| 4,662,004 | 4/1987 | Fredriksen et al. | 455/607 |
| 4,746,180 | 5/1988 | Deisler et al. | 350/96.1 |
| 5,060,304 | 10/1991 | Solinsky | 359/152 |
| 5,062,150 | * 10/1991 | Swanson et al. | 359/152 |
| 5,065,455 | 11/1991 | Ito et al. | 359/159 |
| 5,142,400 | 8/1992 | Solinsky | 359/159 |
| 5,247,174 | 9/1993 | Berman | 250/235 |
| 5,329,395 | 7/1994 | Endo et al. | 359/159 |
| 5,347,387 | 9/1994 | Rice | 359/152 |
| 5,594,580 | 1/1997 | Sakanaka et al. | 359/172 |
| 5,923,452 | * 7/1999 | Carlson | 359/172 |
| 5,926,594 | * 7/1999 | Song et al. | 385/49 |

OTHER PUBLICATIONS

"Using Fiber Optics To Simplify Free–Space Lasercom Systems", Swanson, E.A. and Bondurant, R.S., SPIE vol. 1218 Free–Space Laser Communication Technologies ll (1990).

* cited by examiner

Primary Examiner—Leslie Pascal
Assistant Examiner—Dalzid Singh
(74) Attorney, Agent, or Firm—Jones, Day, Reavis & Pogue

(57) ABSTRACT

A free-space optical lasercom system is disclosed which includes an optical subsystem for receiving an Rx signal and sending a Tx signal, wherein said optical subsystem establishes a focal plane.

A first optical fiber with an end coupled to the optical subsystem for directing the Rx signal to an RX detector. A second optical fiber is also included with an end coupled to the optical subsystem for directing the Tx signal from a Tx laser source. A linear X-Y shifting apparatus is used for positioning the respective ends of the first and second optical fibers in the focal plane of the optical subsystem so as to maintain a desired coupling efficiency.

15 Claims, 10 Drawing Sheets

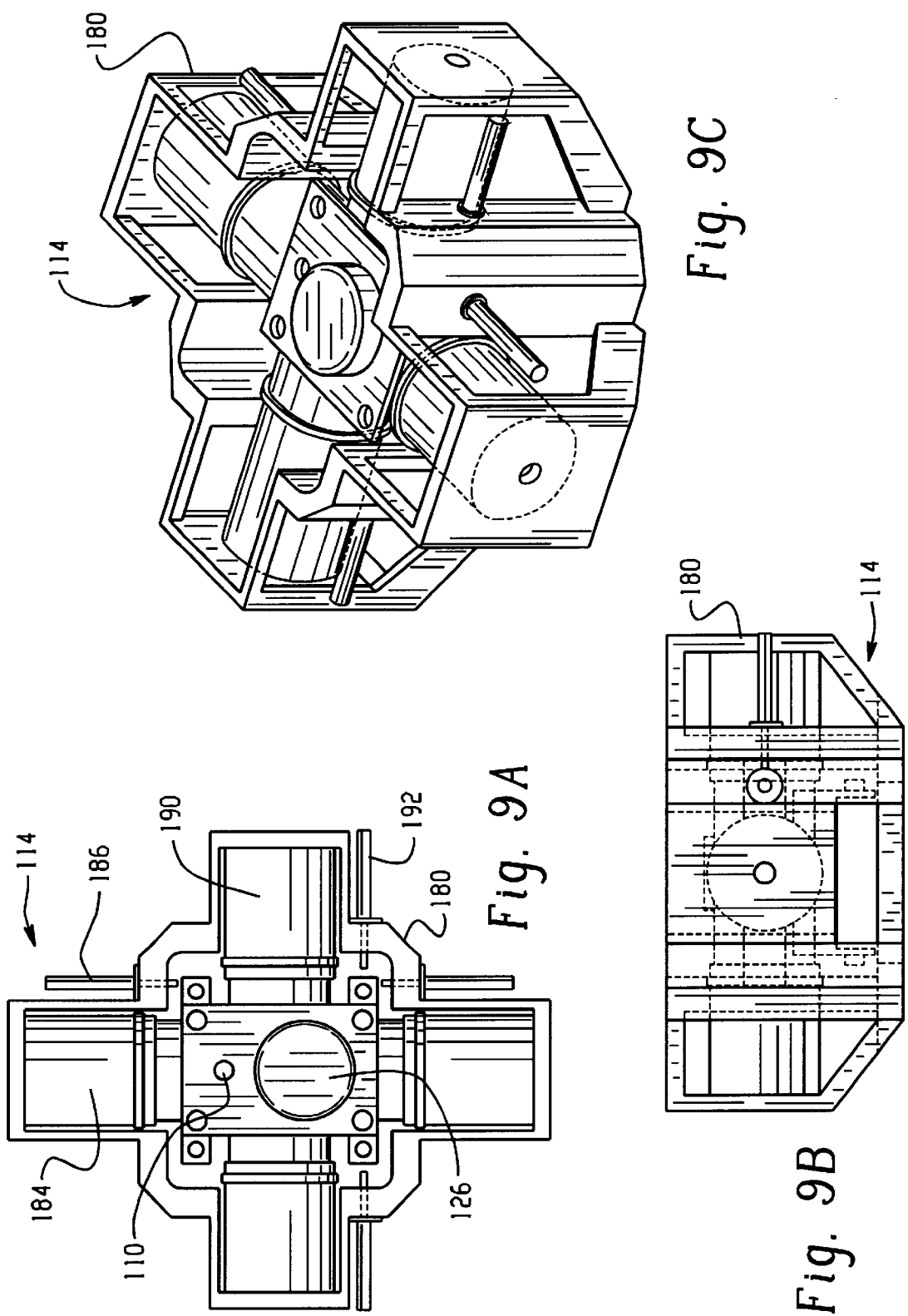

FREE-SPACE OPTICAL LASERCOM SYSTEM

BACKGROUND OF THE INVENTION

The present invention pertains to the field of free-space optical communication, particularly of the type used for two-way satellite communication, i.e. with an incoming Rx signal and an outgoing Tx signal. Effective communication between lasercom terminals requires precision pointing and tracking of the signal beams, and fine beam steering control is significant. In previous systems, rotating deflecting mirrors were the only reliable means of providing the required speed, range, accuracy and repeatability of beam steering.

The use of rotating mirrors in previous systems necessitates a complex optical subsystem, including at least one telescope with an eyepiece to form an afocal reducer, at least one afocal relay (or two relays for a telescope without a field lens) and a focusing lens. Large transverse magnifications are required for an afocal reducer to produce a large field of view in the image space. Also, to achieve high pointing accuracy, the entrance and exit pupils of the system must be well defined, and they must coincide with the respective steering mirrors. Thus, multi-element lens groups must be employed for relays, eyepieces and detector optics. Such systems are costly to manufacture and also have high mass which is undesirable for deployment and operation in satellite applications.

In addition to the above, the optical subsystem for the previous lasercom terminal design requires a large number of optical surfaces. Each optical surface contributes deformation to the optical wavefront due to optical material imperfections, manufacturing errors, assembly and alignment errors and environmentally-introduced errors, such as temperature gradients and vibrations. However, satellite lasercom systems must propagate efficiently over thousands of kilometers, and must provide efficient coupling to the internal detector components. Thus, wavefront error must be minimized. A state-of-the-art optical terminal must be diffraction-limited with a very small wavefront deformation budget (i.e. total cumulative RMS error smaller than 0.07 of a wavelength of laser light). It is a technically challenging task to meet such a requirement in a system involving so many optical surfaces.

Further, each optical surface inherently scatters a portion of the beam, further reducing efficiency and elevating the stray light level. This can result in optical crosstalk between the transmission and receiving channels, in addition to other errors such as lower than expected BER, burst errors, and failure to acquire and track a signal in the presence of background radiation (such as from celestial sources, i.e. the Sun, Earth, Moon and planets, and also reflections and scatter from the satellite). Typical previous optical architectures require 50 optical surfaces or more, resulting in significant contributions to the above-noted problems.

There are other sources of optical crosstalk, and several design strategies are typically implemented, such as carefully designing baffles and stops, and using narrowband spectral filters. In addition, there are several known approaches at the optical subsystem level for reducing crosstalk. FIG. 1 shows a previous system that provides complete spatial separation of the Rx and Tx signals by using two telescopes 10, 12. While this design offers excellent control of stray light, it creates other problems such as significantly increasing mass, difficulty in alignment increased optomechanical complexity, and numerous optical surfaces in the subsystem.

Another approach is shown in FIG. 2, in which partial spatial separation is accomplished with a single telescope 20 and a shearing aperture 22, where Rx and Tx signals share the same optical path. The Tx source 24 is drawn off a separate optical path from the Rx detector 26 by e.g. a reflecting mirror 28. While lighter in weight as less complex than the two-telescope design, the shearing aperture approach has poor stray light control since it is impossible to isolate the Tx beam from the Rx beam.

FIG. 3 illustrates polarization isolation, in which a single telescope 30 is used, and the Rx and Tx signals are distinguished as perpendicular polarized beams separated by a polarizing diplexer 32, which sorts the Rx and Tx beams along separate optical paths. This method requires the highest quality polarization components and extremely tight control of the state of polarization as the Rx and Tx beams propagate through the subsystem.

FIG. 4 illustrates dichroic isolation, in which a single telescope 40 is used, and different laser wavelengths are used for the Rx and Tx channels. The separate optical paths are defined by a dichroic beamsplitter 42. As a result, the two communicating terminals are precluded from operating at identical wavelengths.

In previous systems, as shown in FIG. 5, track detection is accomplished using a fast steering mirror (FSM) 50 which shifts in position to correct for mispoint in Rx channel beam. A beam splitter 52 directs the Rx signal to an Rx detector 54, and directs a portion of the Rx signal to a track detector 56. Since the Rx detector 54 and the track detector 56 are aligned, the FSM 50 cancels out mispoint on both simultaneously. However, the physical size of the track detector 56 limits the field of view of track detection. Thus, previous tracking systems are only sensitive to small angular mispoints, which makes signal acquisition and tracking more difficult.

In all previous designs, boresight alignment also poses a major technical challenge. Typically, for communication distances greater than 4000 km, the communication Rx and Tx beams should be aligned within 1–3 microradians in free space. The corresponding misalignment requirement between channels may be even less than one microradian. While such boresight alignment is difficult to achieve during manufacture, it is even more difficult to maintain during launch deployment and on-orbit operation. Due to the long optics required for previous systems, the channel inputs must be separated by a great physical distance, which requires an extremely stable and expensive mechanical structure with tight controls over environmental variables.

BRIEF DESCRIPTION OF THE INVENTION

In view of the drawbacks and disadvantages of previous systems, there is therefore a need for a lasercom system with reduced optical crosstalk.

There is also a need for a lasercom system with reduced mass.

There is also a need for a lasercom system with a reduced number of optical surfaces.

There is also a need for a lasercom system with a simplified optical and mechanical structure.

There is also a need for a lasercom system with reduced wavefront deformation.

There is also a need for a beam steering and tracking system that does not use rotating mirrors.

There is also a need for a lasercom system that provides active alignment compensation.

These needs and others are satisfied by the free-space optical lasercom system of the present invention in which a free-space optical lasercom system is disclosed including an optical subsystem for receiving an Rx signal and sending a Tx signal, wherein said optical subsystem establishes a focal plane. A first optical fiber is provided with an end coupled to the optical subsystem at a focal plane for directing the Rx signal to an Rx detector. A second optical fiber is provided with an end coupled to the optical subsystem at a focal plane for directing the Tx signal from a Tx laser source. A linear X-Y shifting means is disclosed for positioning the respective ends of the first and second optical fibers in the focal plane of the optical subsystem so as to maintain a desired coupling efficiency and also a required precision in pointing the Tx laser beam. Both fibers move in telecentric space so that a linear X-Y shift of the fiber is transformed into an angular shift of the beam in free space.

As will be appreciated, the invention is capable of other and different embodiments, and its several details are capable of modification in various respects, all without departing from the invention. Accordingly, the drawings and description are to be regarded as illustrative in nature and not restrictive.

BRIEF DESCRIPTION OF THE DRAWINGS

The embodiments of the invention will now be described by way of example only, with reference to the accompanying figures wherein the members bear like reference numerals and wherein.

DETAILED DESCRIPTION OF THE INVENTION

Figure 1:
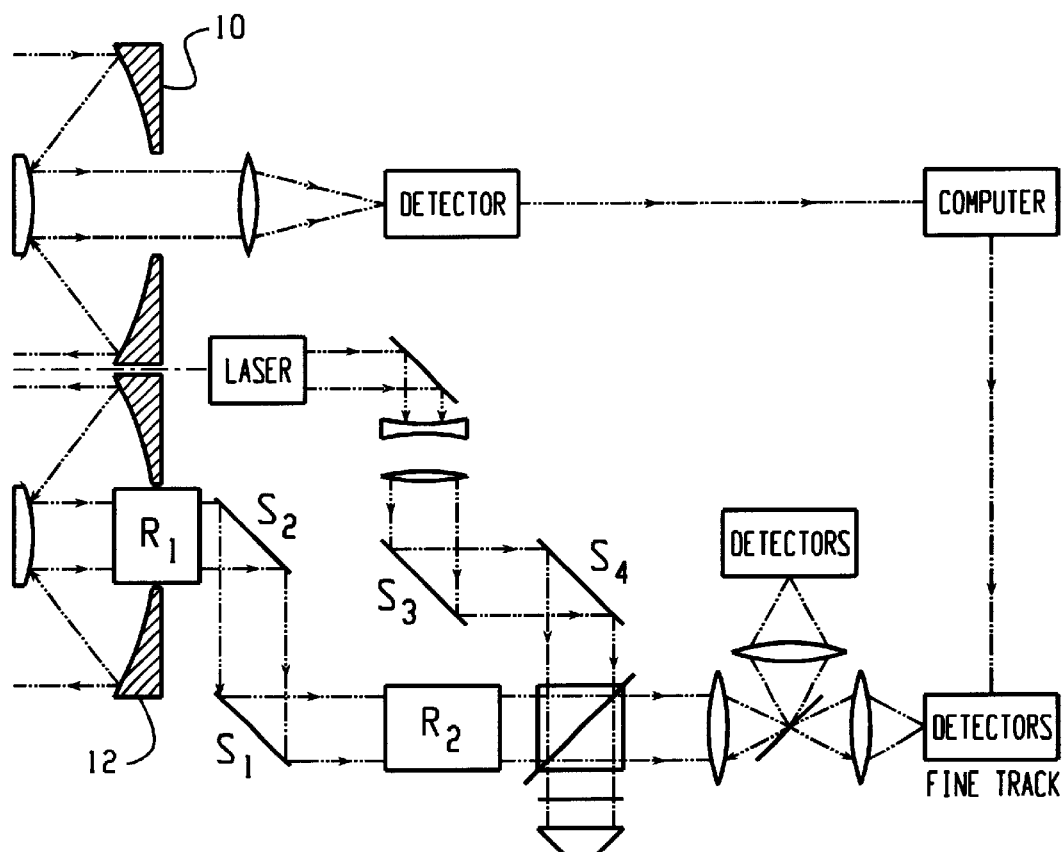
FIG. 1 schematically illustrates a previous optical subsystem that provides complete spatial separation of the Rx and Tx channels.
Figure 2:
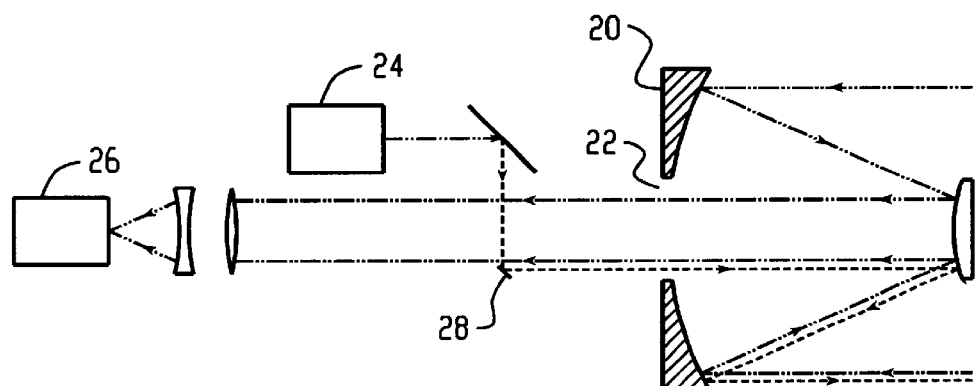
FIG. 2 schematically illustrates a previous optical subsystem that provides partial spatial separation of the Rx and Tx channels.
Figure 3:
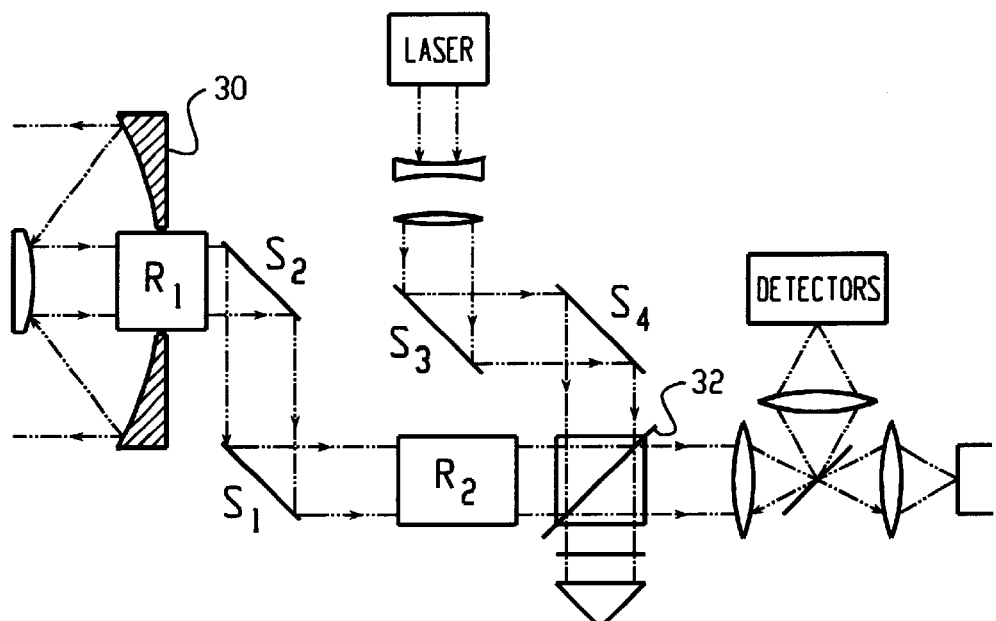
FIG. 3 schematically illustrates a previous optical subsystem that provides polarization isolation of the Rx and Tx channels.
Figure 4:
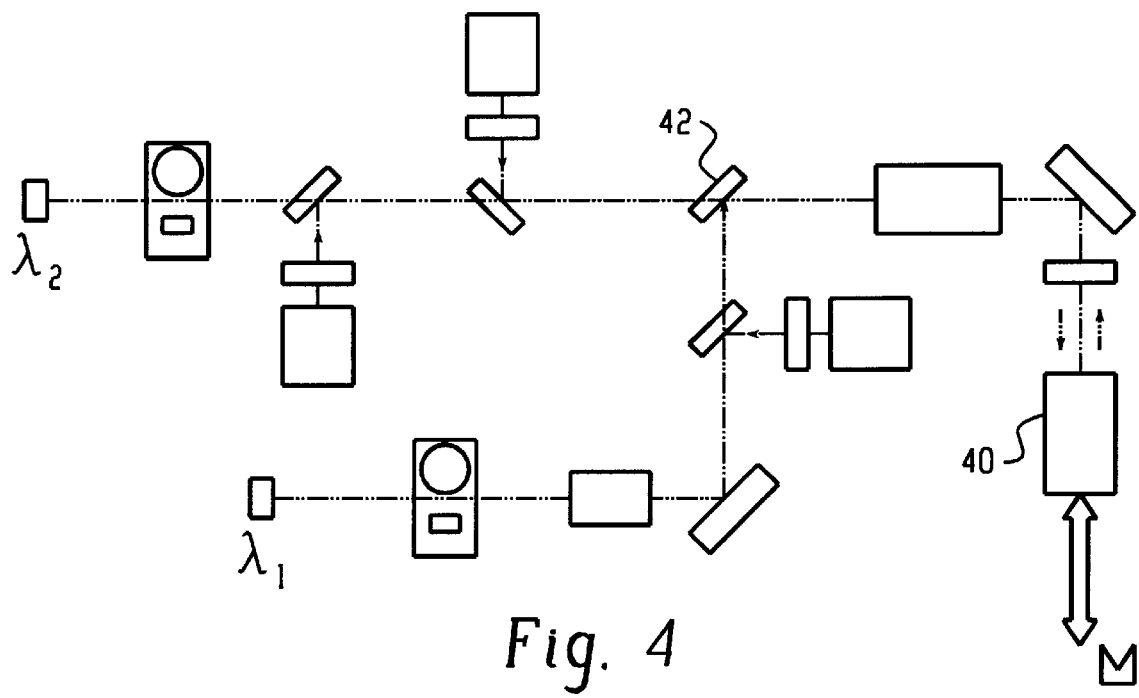
FIG. 4 schematically illustrates a previous optical subsystem that provides dichroic isolation of the Rx and Tx channels.
Figure 5:
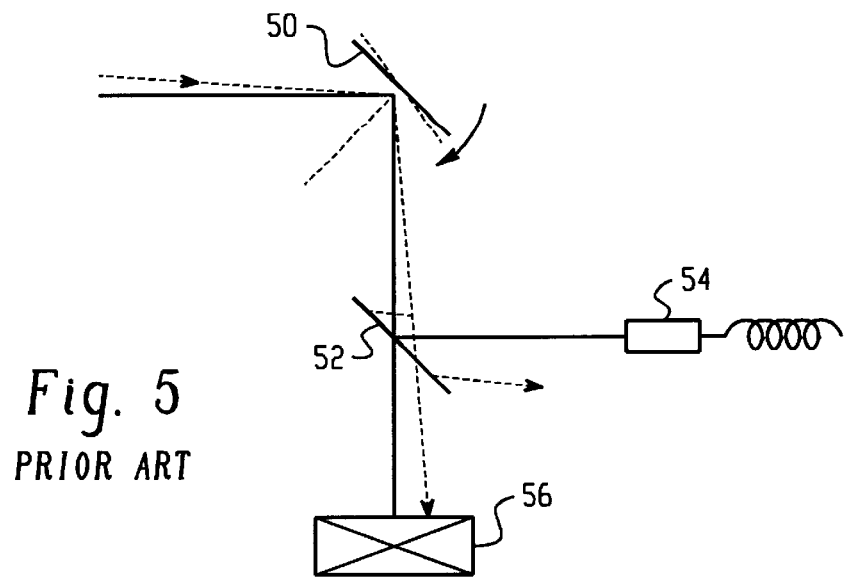
FIG. 5 schematically illustrates a previous track detection assembly.
Figure 6:
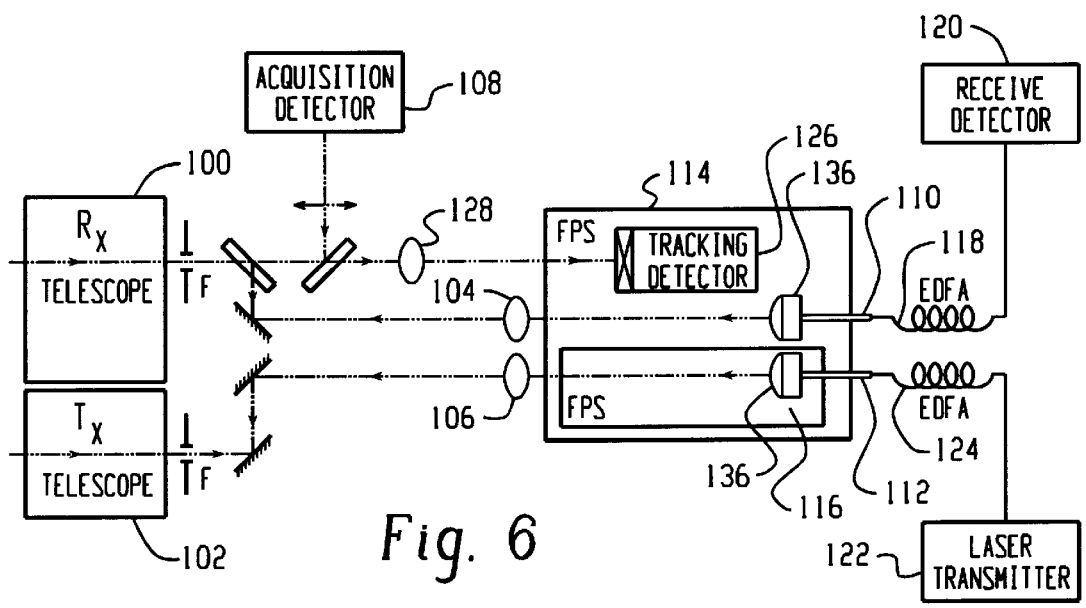
FIG. 6 schematically illustrates the lasercom system as according to a first embodiment of the present invention.

FIG. 6 illustrates the optical structure of the lasercom terminal of a first embodiment of the present invention. An optical subsystem is used for receiving an Rx signal from a remote terminal, e.g. a satellite, and sending a Tx signal toward the same or a different remote terminal. The optical subsystem includes a dual telescope, i.e. an Rx telescope 100 and a Tx telescope 102, which form a respective pair of afocal reducers, and cooperate respectively with an Rx telecentric focusing lens 104 and a Tx telecentric focusing lens 106. In the preferred embodiment, the beams are collimated beams in the space between the telescopes 100, 102 and the focusing lenses 104, 106. In the preferred embodiments, the focusing lenses 104, 106 have a focal length effective to establish a focal plane for respective Rx optical fiber 110 and a Tx optical fiber 112.

Figure 7A:
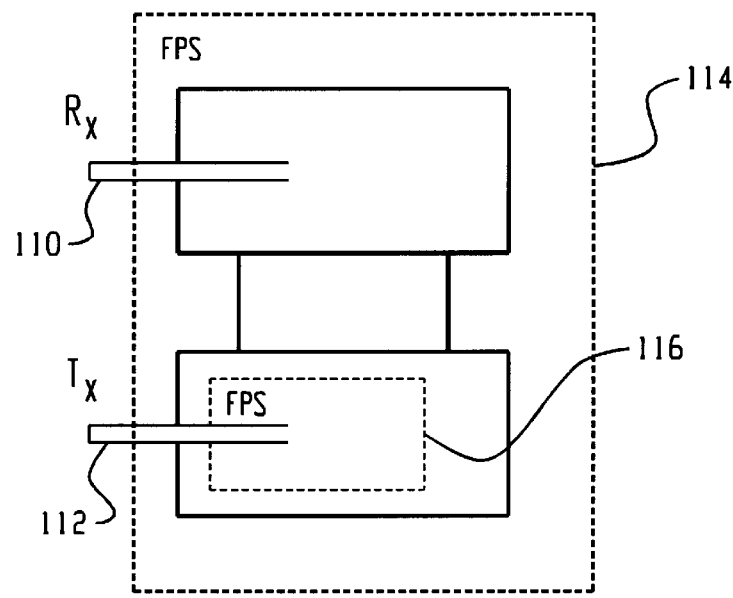
FIGS. 7A and 7B schematically illustrate the linear positioning arrangement for the Rx and Tx optical fibers, as according to the present invention.

As is also seen in FIG. 7A, the present invention includes a precision X-Y linear shifter which is used to precisely position the optical fibers 110, 112 in the focal plane of the optical subsystem, so as to align the optical fibers with the respective beams. The Rx signal, after entering the Rx optical fiber 110, passes through an Erbium Doped Fiber Amplifier (EDFA) 118 where it is detected by a lasercom detector 120, preferably a PIN diode, where it is transduced into an electrical signal which is processed by the terminal electronics. The Tx signal is generated by a laser diode 122, which in the illustrated embodiment is a 1552 nm infrared laser source. The Tx signal propagates through an EDFA 124 and outward through the optical system. An acquisition quadcell detector 108 is used with a beamsplitter and appropriate optics to provide proper signal acquisition for the terminal.

Figure 7B:
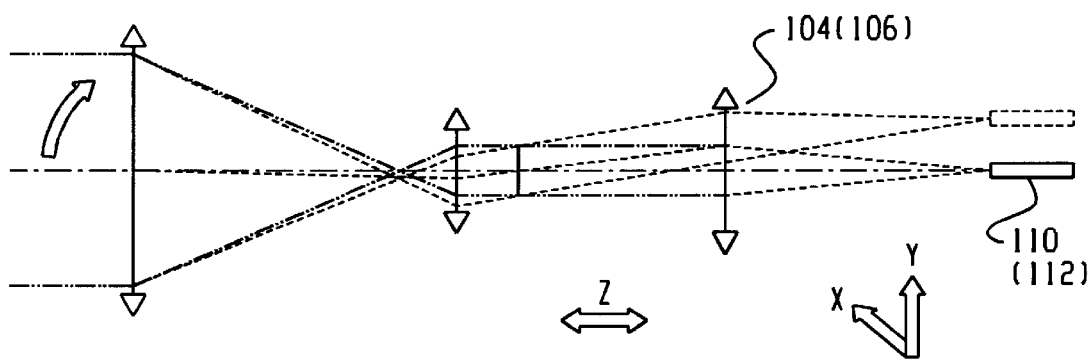
Figure 9D:
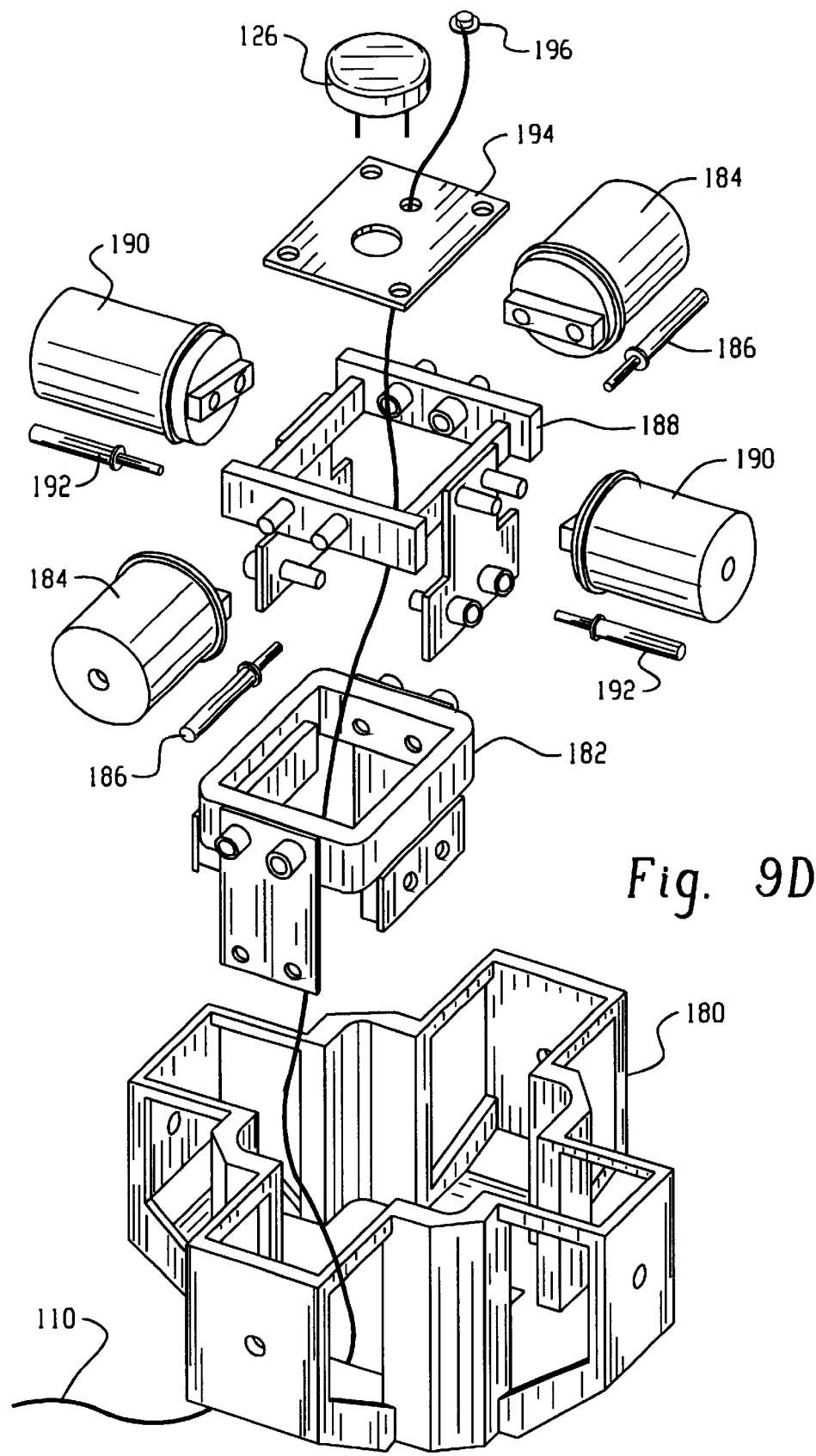
FIG. 9 schematically illustrates the track detection assembly according to the present invention.

The present invention uses a novel alignment system. The focusing lenses 104, 106 are telecentric, and thus have the property that the central ray of the optical beam passing through the lenses 104, 106 will be parallel to the optical axis of the lenses, regardless the angular orientation of the incident beam. Thus, the Rx telecentric lens 104 defines a flat focal plane for beams arriving from any angle of incidence. In this way, as shown in FIG. 7B, it is only necessary to linearly shift the Rx optical fiber 110 in an X-Y plane without rotation to align with the Rx signal beam, irrespective of the angle of incidence. Similarly, a linear X-Y shift in the Tx fiber 112 results in an angular transformation of the propagating Tx beam through the Tx focusing lens 106. This linear-to-angular transformation is expressed as the "travel gain" G for effecting a fine alignment function of the system. Depending on the parameters of various working embodiments, the system can have a travel gain of about 1–6 microns of linear shift per microradian of angular displacement. (The fiber travel design parameters of a working embodiment is given below in Table I.)

Accordingly, a travel stage, i.e. an X-Y shifter 114 is used to linearly vary the position of both the Rx and Tx fibers 110, 112. A separate X-Y shifter 116 is added to the Tx stage to make minor adjustments to Tx fiber. In this way, a large measure of active control is enabled over the Rx and Tx channels, which is useful for communication, signal acquisition, point-ahead and tracking functions. Additionally, this active alignment capability also permits active correction of boresight misalignment due to environmental changes, both long and short term, such as temperature changes, operation-induced deformations, and aging of the optomechanical structure. Also, with the present invention, the channels can be located physically closer together reducing sensitivity to misalignment. Additionally, the traveling fiber arrangement is significantly lightweight compared to the previous tracking mirror structures, resulting in considerable savings in payload delivery and reduced inertia during operation.

Figure 8:
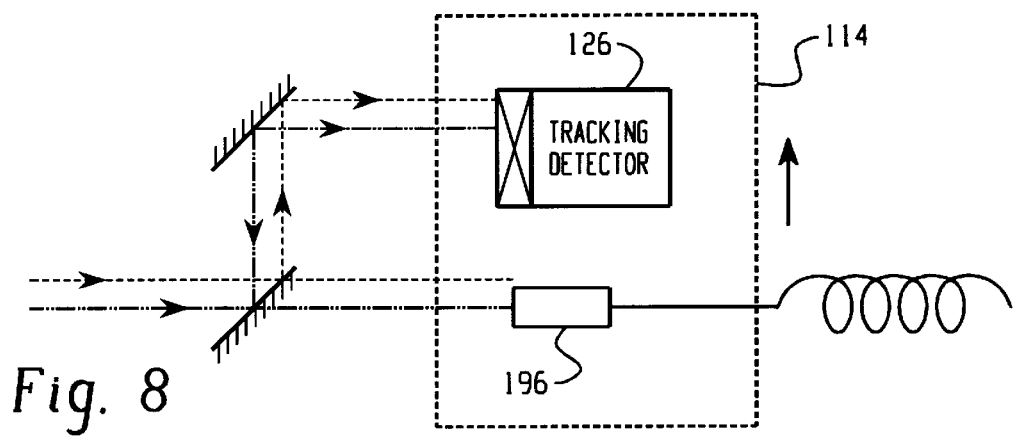
FIGS. 8A, 8B, 8C and 8D are respective top, side, oblique and exploded views of an exemplary linear positioning arrangement, as according to the present invention.

As is shown in FIG. 8, the traveling stage 114 also carries a track detector 126, which moves together with the Rx fiber 110. The track detector 126 is preferably a multi-element detector, e.g. a single quadrant photodiode. The present X-Y shifter 114 can be realized by many different technologies, such as with piezoelectric, voice coil and electrostrictive actuators. An exemplary embodiment is shown in FIGS. 9A, 9B, 9C and 9D, which is given for purposes of illustration alone, and is in no way intended to limit the scope of the invention.

The travelling stage 114 includes a housing 180 which is held stationary against displacement. An X-motion fiber stage 182 is provided, and is displaced in an X-direction with a pair of X-motion actuators 184. The magnitude of displacement is measured with respective X-motion differential impedance transducers 186. Similarly, a Y-motion fiber stage 188 is provided with respective Y-motion actuators 190 and transducers 192. A printed circuit assembly 194 is mounted on the Y-motion stage, which provides a mounting surface for the optical fiber tip 196, along with an electrical connection for the tracking detector 126.

As shown in FIG. 8, the track detector 126 and the Rx fiber tip are mounted on the same stage, with the Rx signal being divided by a beamsplitter. This results in the canceling out of mispoint in both elements simultaneously. Due to the telecentricity of the forward optics, angular mispoint of the incoming Rx signal is transformed into a linear shift that is compensated by the traveling stage 114. In this way, the field of view is not limited by the physical size of detector 126 itself, but only by the range of travel of the stage. In this way, the present invention is not limited as were previous systems, and a greater range of control is provided.

Figure 10A:
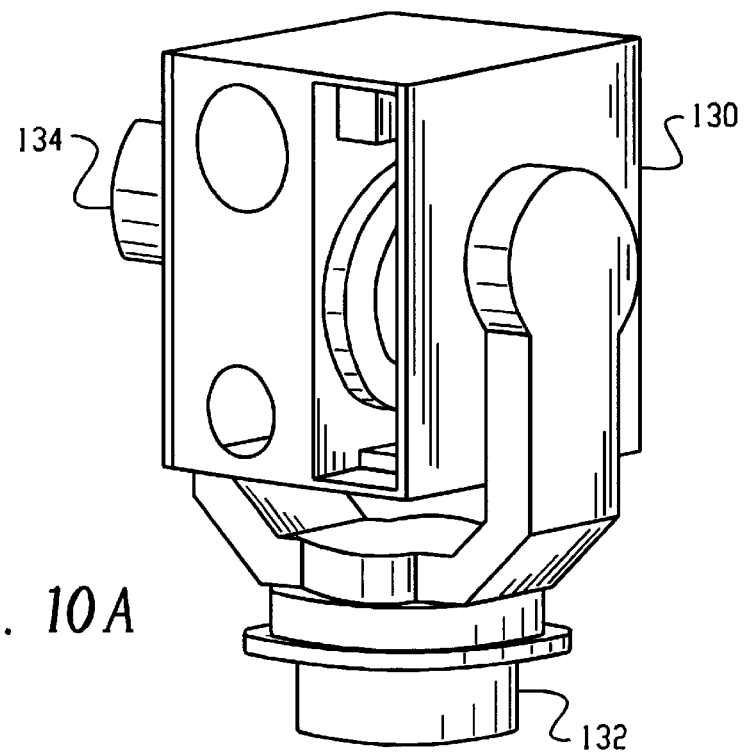
FIGS. 10A and 10B illustrate the lasercom terminal package with gimbal mount of the present invention.
Figure 10B:
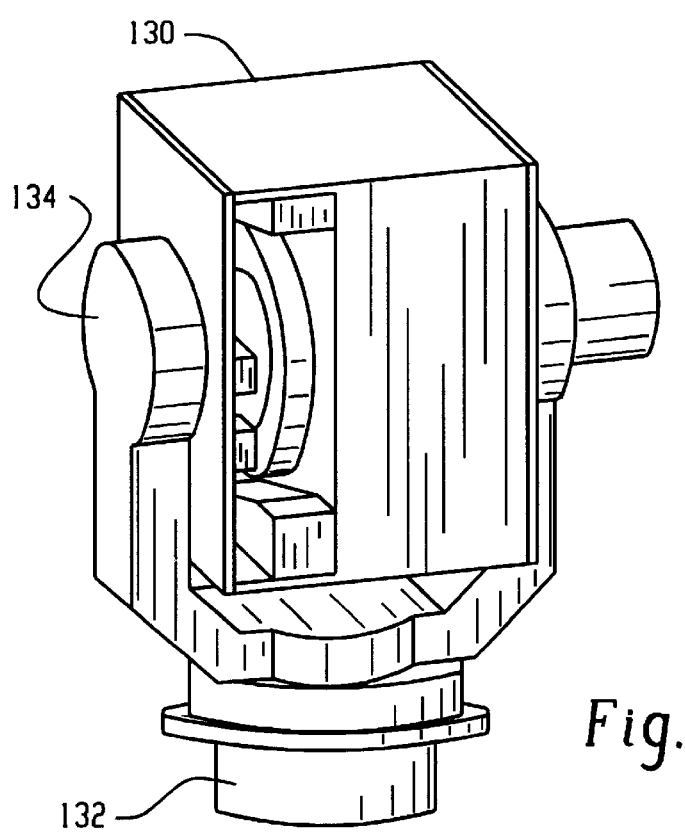

The traveling stage 114 is used to effect fine positional adjustment of the fiber tips for pointing and tracking. As is shown in FIGS. 10A and 10B, course adjustments in pointing and tracking capability are carried out in the present invention using a gimbaled mount for carrying the complete lasercom terminal 130. The gimbaled mount includes an azimuth actuator 132 and an elevation actuator 134 for pointing the laser com terminal 130 in a desired direction for communicating with a particular remote terminal. The actuators 132, 134 are sufficiently accurate so as to position the entire terminal in such a way as to align the traveling stage 114 with the remote terminal, in order to effect communication. The precision of the system must be greater than the total field of view of the track detector 126, so as to permit signal acquisition. The precision can vary with the requirements of the system, but for most configurations, an accuracy of within 10's of arcseconds is sufficient.

A first embodiment of the optical subsystem of the present invention is shown in FIGS. 11A, 11B, 12A and 12B. In this embodiment, the telescopes 100, 102 are in fact a single telescope system in which a common objective is used for both the Rx and Tx signal optical paths, to couple with the respective focusing lenses 104, 106. Mersenne telescope is preferably used, in which a pair of confocal parabolic mirrors 140, 142 are used to create an afocal telescope having a folded optical path, thereby reducing the size of the telescope. This system preferably provides an angular magnification of about 5×. A baffle 144 is preferably used to separate the optical paths, providing excellent control of stray light. Such a "two-in-one" telescope provides the benefits of the two-telescope approach while providing the reduced mass and optomechanical simplicity of previous single telescope designs.

Figure 11A:
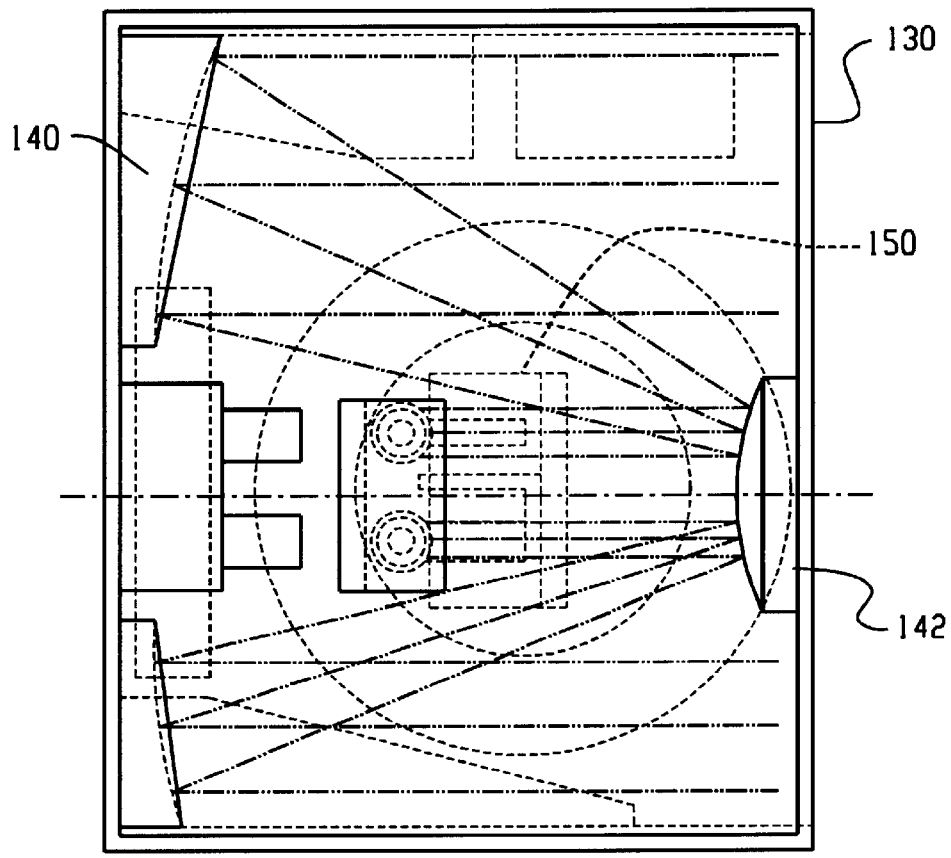
FIGS. 11A and 11B are side-sectional views illustrating the configuration of the present lasercom terminal package.
Figure 11B:
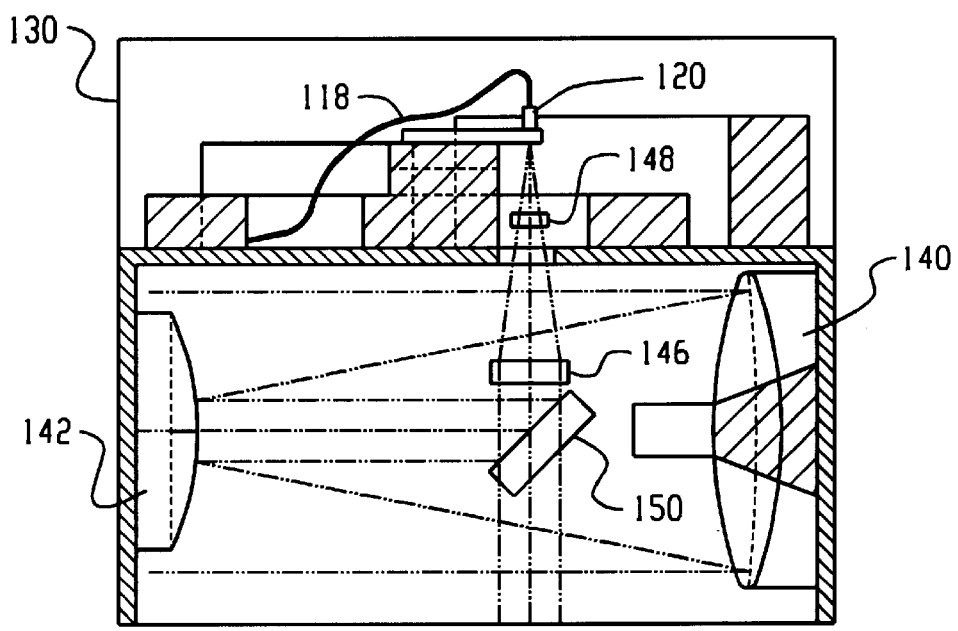
Figure 12A:
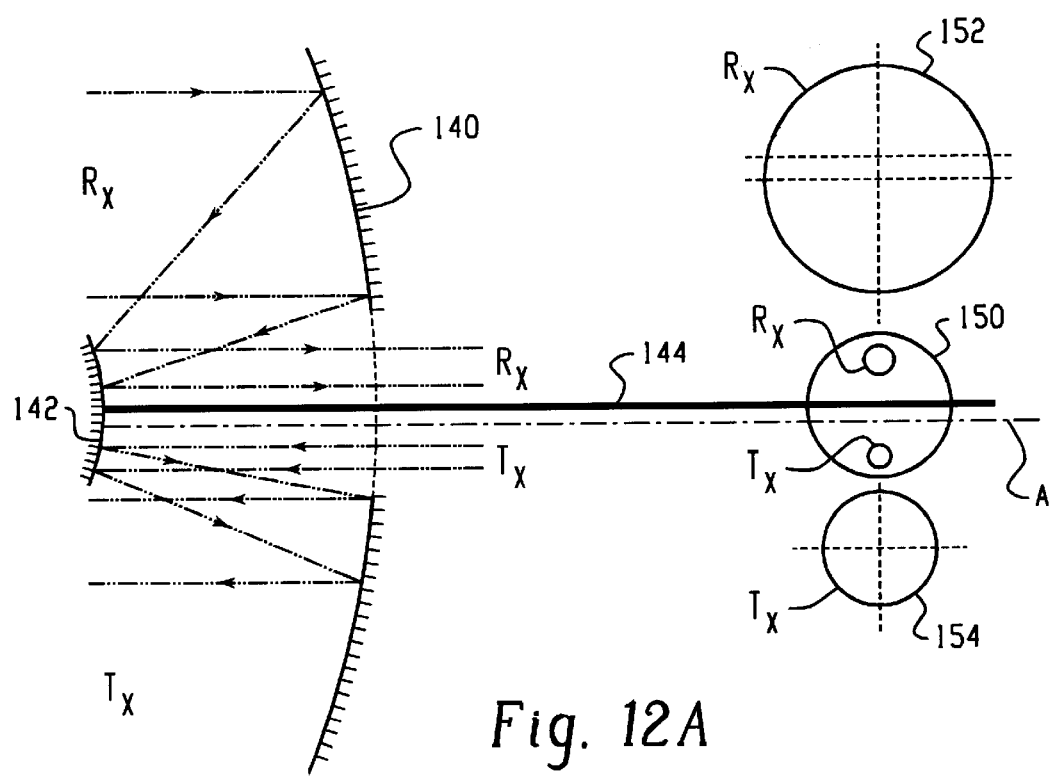
FIGS. 12A and 12B illustrate the spatially-isolated optical subsystem as according to the first embodiment of the present invention.
Figure 12B:
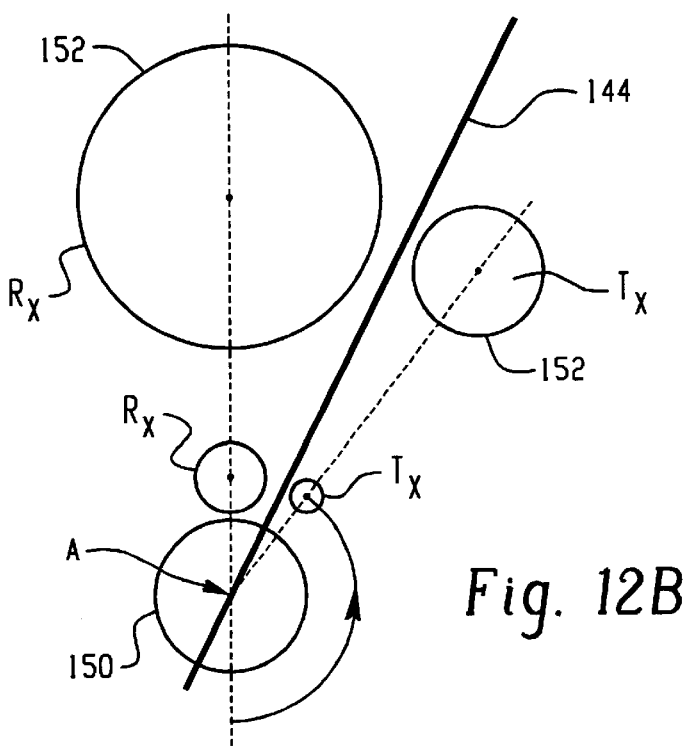

FIGS. 11A and 11B illustrate the lasercom terminal 130 with the optical subsystem of the first embodiment. The telecentric focusing lenses 104, 106 include a positive lens group 146 and a negative lens group 148, properly configured in a telephoto arrangement to allow compact and efficient packaging of the various modules. The optical path can be folded by using a flat folding mirror 150 (as shown in FIGS. 11A, 11B, 12A and 12B) to direct the light at a desired angle β, where β is preferably 90 degrees to the axis of rotation of the primary 140 and secondary 142. In this way, the physical size of the system is further reduced, resulting in considerable savings of mass and size, permitting the package to be gimbal mounted, eliminating the need for a complex coude mount as seen in previous systems. Of course, the invention is not limited to the above configuration, and many configurations may be contemplated without departing from the invention.

The basic parameters of the optical subsystem are determined as follows: The entire afocal reducing system has a magnification M, and the focusing lenses 104, 106 have focal lengths f, and so the equivalent focal length of the complete optical system is Mf. If the required field of new in the object space is W, the required maximum linear shift in the direction of interest will be Mf tan W, assuming no aberration from the optical elements. This value must match the maximum linear shift available with the linear actuator 114 for the required bandwidth. The numerical aperture NA of the optical fibers 110, 112 must correspond to the diameters of the collimated axial beams 152, 154 of the Rx and Tx signals as they exit the respective telescopes 100, 102 and impinge upon the focusing lenses 104, 106. These diameters are given by f (2NA), and so the entrance pupil diameter of the optical front-end is Mf (2NA), which will usually be the diameter of the primary mirror. Thus, the product Mf can be determined from the required field and aperture. Magnification of the telescope can be further determined from the requirements of its length, obscuration (or optical clearance) and aberration correction. In the dual telescope configuration illustrated at present, it is highly advantageous if the values of M and f are the same for both telescopes. The values of NA and pupil diameter can be different as long as both have the same angular field of view in the object space. The above considerations do not take into account the additional angular offset for point-ahead correction of the Tx channel, which only requires an additional offset of the field of view for that channel. Numerical values of these parameters for a working embodiment are shown in the following Tables I:

TABLE I

FIBER TRAVEL DESIGN PARAMETERS

|  | Symbol | Nominal |  |  |
| --- | --- | --- | --- | --- |
| Given Parameters |  |  |  |  |
| Wavelength |  | 1.552 | microns |  |
| Telescope Aperture |  | 130 | mm |  |
| Telescope Magnification |  | 7 |  |  |
| Fiber NA |  | 0.0563 |  |  |
| Fiber Core Diameter |  | 10 | microns |  |
| Track FOV |  | 200 | microrads | in Free Space |
| ACQ FOV |  | 20000 | microrads | in Free Space |
| Max Point-Ahead Angle |  | 150 | microrads | in Free Space |
| Point-Ahead Accuracy |  | 1 | microrads | in Free Space |
| Calculated Parameters |  |  |  |  |
| Equivalent Focal Length (FFL) |  | 1155.2 | mm |  |
| Focal Length of the Telec Lens |  | 165.0285714 | mm |  |
| Telecentric Lens F-number |  | 8.886153846 |  |  |
| Travel Gain | G | 1.1552 | microns/microrad |  |
| Travel Range for Track |  | 231.04 | microns |  |
| Travel Depth of focus (axial) |  | 245.1034185 | microns | Total Range for 1 dB Loss |
| Travel Range for P-A |  | 173.28 | microns |  |

Figure 13A:
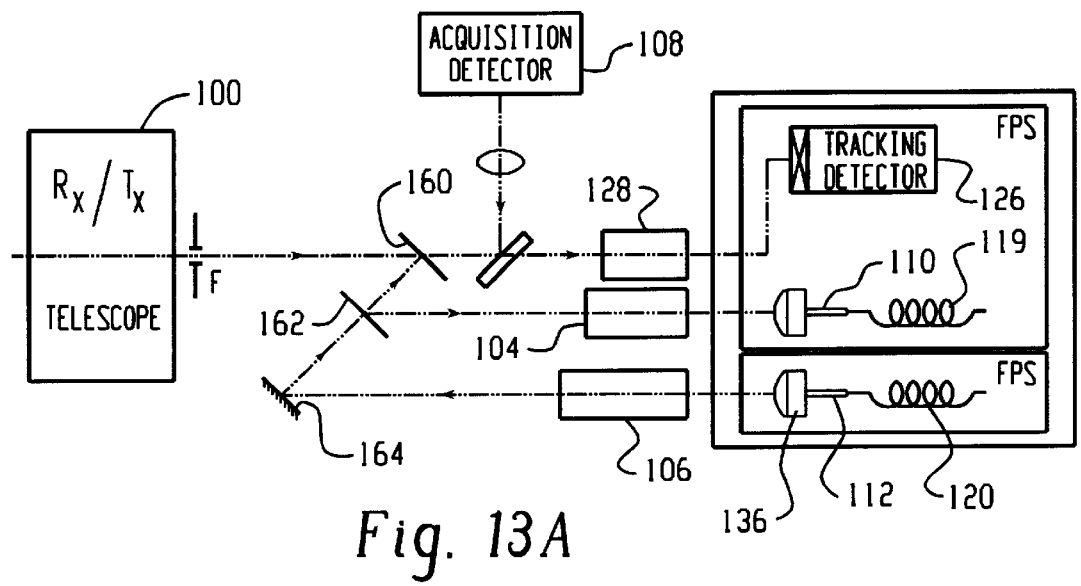
FIGS. 13A and 13B schematically illustrate the dichroically-isolated optical subsystem as according to second and third embodiments of the present invention.
Figure 13B:
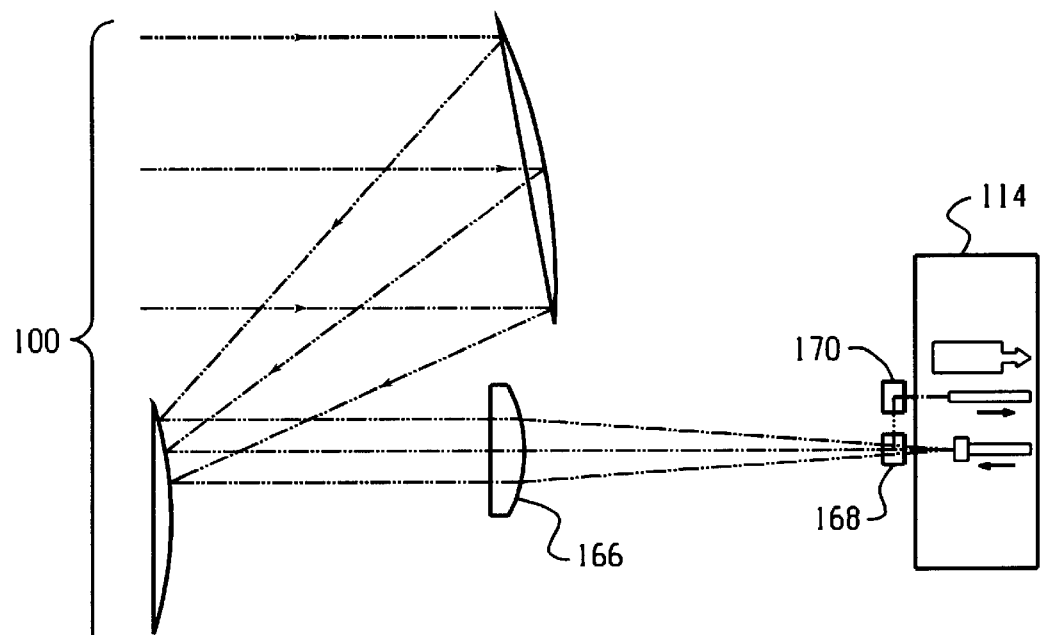

The spatial isolation embodiment particularly depicted in FIGS. 11A, 11B and 12A, 12B is very useful for closely-positioned terminals. However, this design requires a Tx aperture that is much smaller than the Rx aperture. Consequently, spatial isolation is not practical for separations greater than 1000 km since too much laser power is required for the Tx channel. For long-distance communication ranges of 4000–6000 km or more, the minimum laser power requirement is satisfied when the sizes of the Rx and Tx apertures are equal. For these distance requirements, a dichroic isolation embodiment is employed, as shown in FIGS. 13A and 11B. As seen in FIG. 13A, a common Tx/Rx telescope 100 is used to define a single aperture. A dichroic beamsplitter 160 is used to separate a portion of the Rx signal for use as a beacon for detection by the acquisition sensor 108 and tracking sensors 126. A Fabry-Perot etalon 162 is used to direct the remaining Rx signal to the Rx optics. A fold mirror 164 received a Tx signal (differing in wavelength from the Rx signal) and directs the beam back through etalon 162 and beamsplitter 160, or through the telescope 100 toward the remote terminal. In a variant embodiment shown on FIG. 11B, a common telecentric lens 166 can be used for the track detector 126, along with Rx and Tx fibers 110, 112, thereby further reducing the mass and the number of optical surfaces. The respective signal wavelengths are optically processed through a pair of dichroic beamsplitters 168, 170. Also, in this embodiment, two separate X-Y stages are implemented instead of a single satge 114 (see FIG. 13A).

The present invention can also include active repositioning of the optical fibers in the Z-direction (i.e., along the optical axis) to compensate for longitudinal defocuss, to actively defocus the system in an emergency situation. Also, such positioning allows a highly divergent Tx beam with a significantly enlarged field of view during the phase of signal acquisition between satellite terminals. For example, a 10 microradian beam may typically be used to communicate between terminals, but a divergence on the order of hundreds of microradians may be necessary to acquire a signal during the acquisition phase. Such change in divergence can be easily achieved by actively defocusing the fiber. This feature is also useful for compensating for mechanical fluctuations that may occur in space, especially for the Rx fiber.

The present invention significantly reduces the number of optical elements resulting in a diffraction-limited, high-optical-performance system. The reduced mass of the system facilitates steering of the satellite and reduces payload upon delivery, thus reducing deployment and operating expenses. By eliminating the steering mirrors, the present optical system is much less complex, permitting a modular structure with clearly defined, independent modules. The present invention is more flexible, permitting precise beam steering and tracking at least one order of magnitude better than that required while preserving the required range. In addition to the above, the present system is easier and less expensive to manufacture, which reduces the overall expenses associated with satellite communications.

As described hereinabove, the present invention provides a simplified lasercom terminal with greatly improved efficiency. However, it will be appreciated that various changes in the details, materials and arrangements of parts which have been herein described and illustrated in order to explain the nature of the invention may be made by those skilled in the art within the principle and scope of the invention as expressed in the appended claims.

What is claimed is:

1. A free-space optical lasercom system, comprising:
    an optical subsystem for receiving a receive (Rx) signal and for sending a transmit (Tx) signal, wherein the optical subsystem establishes a focal plane;
    a first optical fiber having an end coupled to the optical subsystem for directing the Rx signal to an Rx detector;
    a second optical fiber having an end coupled to the optical subsystem for directing the Tx signal from a Tx laser source to the optical subsystem; and
    a fiber positioning stage coupled to both of the first optical fiber and the second optical fiber, the fiber positioning stage including a first linear X-Y shifter coupled to both of the first and second optical fibers for simultaneously positioning the respective ends of the first and second optical fibers in the focal plane of the optical subsystem.

2. The free-space optical lasercom system of claim 1, wherein the optical subsystem comprises a telescope system that defines first and second optical paths for a pair of respective off-axis optical systems that couple respective Rx and Tx signals to the first and second optical fibers.

3. The free-space optical lasercom system of claim 2, wherein the telescope system includes a common objective and a baffle for optically isolating the first and second optical paths.

4. The free-space optical lasercom system of claim 2, wherein the telescope system includes a common objective, and the Rx and Tx signals are at different wavelengths along the same optical path, wherein the lasercom system further comprises at least one dichroic beamsplitter for dichroically isolating the respective Rx and Tx signals.

5. The free-space optical laser corn system of claim 1, wherein the optical subsystem comprises at least one telecentric focusing lens for defining a telecentric space so that a linear X-Y shift of one at said first and second fibers is transformed into an angular shift of the signal in free space.

6. The free-space optical lasercom system of claim 1, wherein the fiber positioning stage further comprises a second linear X-Y shifter coupled to one of the first or second optical fibers for making fine adjustments to the displacement of the one optical fiber.

7. The free-space optical lasercom system of claim 6, further comprising a tracking sensor mounted on one of said first or second linear X-Y shifters for tracking the Rx signal.

8. The free-space optical lasercom system of claim 1, further comprising a gimbal mount having actuators to vary elevation and azimuth so as to vary the position of the optical lasercom system.

9. The free-space optical lasercom system of claim 1, further including means for active repositioning of the optical fibers in a Z-direction.

10. A satellite communication terminal, comprising:
    an optical subsystem for receiving a first optical signal and for transmitting a second optical signal, wherein the optical subsystem establishes a focal plane;
    a receive optical fiber coupled to the optical subsystem for directing the first optical signal to a detector;
    a transmit optical fiber coupled to the optical subsystem for directing the second optical signal to the optical subsystem;
    a first fiber positioning stage coupled to both of the receive optical fiber and the transmit optical fiber for simultaneously positioning the receive optical fiber and the transmit optical fiber in the focal plane of the optical subsystem; and
    a second fiber positioning stage mounted to the first fiber positioning stage and mechanically coupled to the transmit optical fiber for finely positioning the transmit optical fiber in relation to the receive optical fiber.

11. An optical communication terminal, comprising:
    an optical subsystem, including:
      a receive telescope;
      a transmit telescope;
      a beamsplitter coupled to the receive telescope for generating a receive data signal and a receive tracking signal;
      a pair of receive telecentric lenses for respectively focusing the receive data signal and the receive tracking signal; and
      a transmit telecentric lens for focusing a transmit data signal onto the transmit telescope;
    a receive optical fiber for receiving the receive data signal;
    a tracking sensor for receiving the receive tracking signal;
    a transmit optical fiber for generating the transmit data signal; and
    a single fiber positioning stage coupled to the receive optical fiber, the tracking sensor, and the transmit optical fiber for simultaneously positioning the receive optical fiber, the tracking sensor, and the transmit optical fiber with respect to a focal plane generated by the optical subsystem.

12. A laser optical communication terminal, comprising:
    an optical sub-system for transmitting and receiving optical signals, wherein the optical sub-system establishes a focal plane;
    a receive fiber coupled to a detector for detecting a received optical signal;
    a transmit fiber coupled to a laser source for generating a transmit optical signal; and
    a fiber positioning stage coupled to the receive fiber and the transmit fiber for simultaneously displacing the ends of the receive fiber and the transmit fiber with respect to the focal plane established by the optical sub-system.

13. The laser optical communication terminal of claim 12, further comprising:
    a tracking detector mounted on the fiber positioning stage for receiving a tracking signal from the optical sub-system.

14. The laser optical communication terminal of claim 13, wherein the optical subsystem further comprises:
    a beamsplitter for splitting an optical signal received by the terminal into the tracking signal and the received optical signal;
    a first telecentric lens for focusing the tracking signal onto the tracking detector; and
    a second telecentric lens for focusing the received optical signal onto the receive fiber.

15. The laser optical communication terminal of claim 12, further comprising:
    a point-ahead fine translation stage mounted to the fiber positioning stage and coupled to the transmit fiber for making fine adjustments to the displacement of the end of the transmit fiber so as to enable point-ahead tracking of another laser optical communication terminal that is receiving the transmit optical signal.

* * * * *

UNITED STATES PATENT AND TRADEMARK OFFICE
CERTIFICATE OF CORRECTION

PATENT NO. : 6,268,944 B1  
DATED : July 31, 2001  
INVENTOR(S) : Stanislaw Szapiel It is certified that error appears in the above-identified patent and that said Letters Patent is hereby corrected as shown below:

<u>Column 9,</u>  
Line 13, delete "laser corn" insert -- lasercom --.

Signed and Sealed this

Second Day of April, 2002

Attest:

*Attesting Officer*

JAMES E. ROGAN  
*Director of the United States Patent and Trademark Office*